Dec. 4, 1923.

W. W. HICKS ET AL 1,476,335

ELECTRIC WATER HEATER

Filed July 17, 1922

INVENTORS.
WILLIAM WESLEY HICKS
ARTHUR J. KERCHER
BY White Frost & Evans
their ATTORNEYS.

Patented Dec. 4, 1923.

1,476,335

UNITED STATES PATENT OFFICE.

WILLIAM WESLEY HICKS, OF SAN FRANCISCO, AND ARTHUR J. KERCHER, OF BERKELEY, CALIFORNIA.

ELECTRIC WATER HEATER.

Application filed July 17, 1922. Serial No. 575,608.

*To all whom it may concern:*

Be it known that we, WILLIAM WESLEY HICKS and ARTHUR J. KERCHER, citizens of the United States, and residents, respectively, of the city and county of San Francisco, and of Berkeley, county of Alameda, both in the State of California, have invented a certain new and useful Electric Water Heater, of which the following is a specification.

The invention relates to electric water heaters and particularly to the circulation type of water heater.

An object of the invention is to provide a small electric water heater having a large heating capacity.

Another object of the invention is to provide an electric water heater of such construction that its heating capacity may be readily changed.

Another object of the invention is to provide a water heater of such construction that burn-outs of the electric heating elements are reduced to a minimum.

The invention possesses other advantageous features, some of which, with the foregoing, will be set forth at length in the following description where we will outline in full, that form of the invention which we have selected for illustration in the drawings accompanying and forming part of the present specification. In said drawings we have shown one embodiment of our invention, but it is to be understood that we do not limit ourselves to such form, since the invention, as set forth in the claims, may be embodied in a plurality of forms.

Referring to said drawings:—

Figure 1:
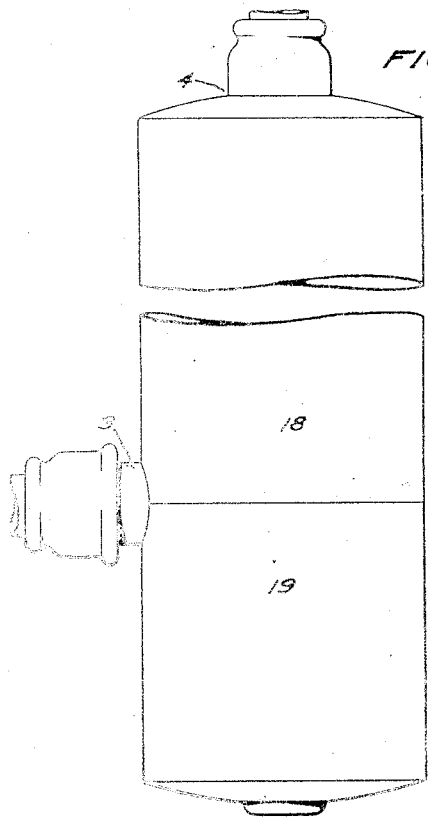
Figure 1 is an elevation of the water heater of our invention.
Figure 2:
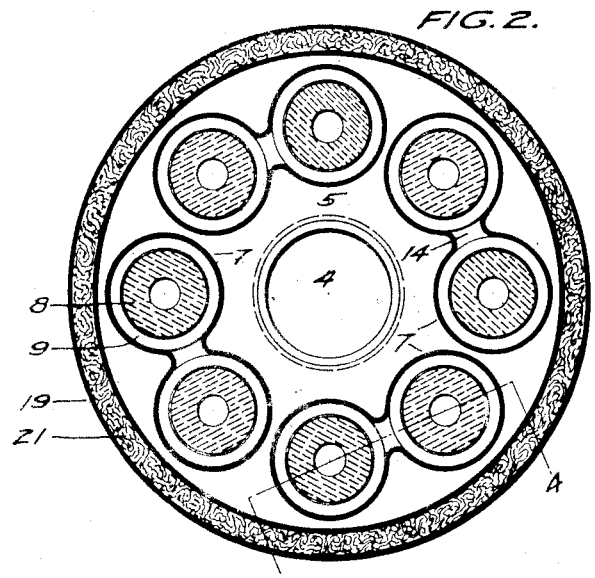
Fig. 2 is a cross section of the heater.
Figure 3:
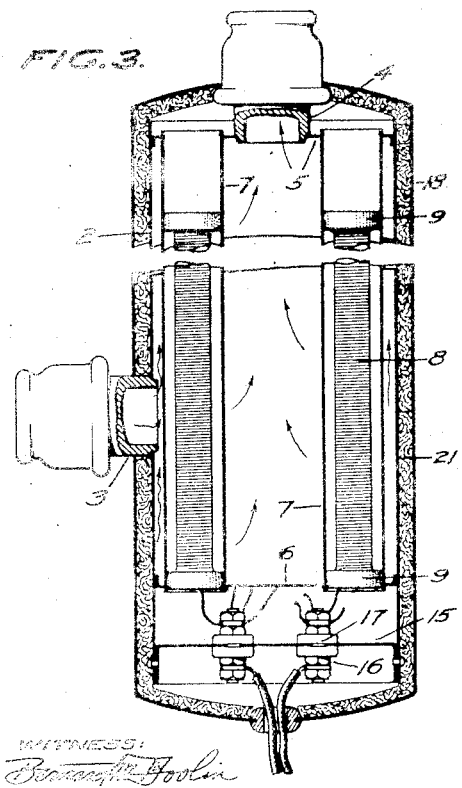
Fig. 3 is a longitudinal section of the heater.
Figure 4:
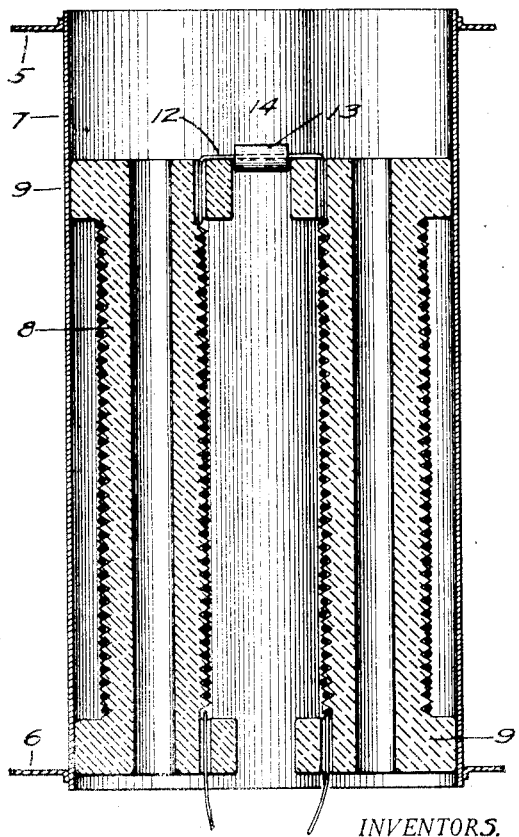
Fig. 4 is a longitudinal section taken on the line 4—4, Fig. 2.

The present device has been designed to provide a large capacity water heater of small dimensions, which is preferably adapted to be used in homes in connection with a storage tank, to heat the water in the tank. The heater is constructed so that heaters of different heating capacity may be provided by changing the number of heating elements. Thus the shells may be made of a standard size and in large quantity and water heaters of different capacities produced by inserting different numbers of heating elements in the shells. The heating elements are also made standard, so that a variety of different capacity heaters may be produced by a manufacturer from shells and heating elements of one standard size. For instance, if a one-watt heater is required, two heating elements may be assembled in the shell; if a two-watt heater is required, four heating elements are assembled in the shell, and so on, to the capacity of the shell. Further, the construction is such that the purchaser may readily vary the capacity of the heater by merely adding or removing heating units.

The heater comprises preferably a cylindrical metallic shell 2 having a water inlet conduit 3 disposed at the side and an outlet conduit 4 disposed at the top. Arranged within the shell are the upper and lower heads 5—6, which enclose the water chamber. Secured to the heads and extending through the water chamber are a plurality of metallic tubes 7 in which the electric heating elements are disposed.

It is desirable that both ends of the resistance wire of the heating elements be connected to terminals disposed at one end of the heater, so that all connections may be made at one place, preferably at the bottom of the heater. The heating elements comprise rods or cores 8 of refractory material provided with a helical thread on which the resistance wire is wound from one end of the core to the other. The cores are provided at their ends with enlarged heads 9 on both ends, which fit snugly in the tubes, centering the resistance coils in the tubes and the cores are preferably of less length than the tubes, so that they are disposed principally in the lower portions of the tubes where they are in close thermal contact with the cooler entering water.

Since the terminals are arranged at the bottom of the heater and since the resistance wire progresses upwardly on the core, means must be provided for connecting the upper end of the resistance wire with the terminal. This has been accomplished by making the core hollow and returning the wire through the core to the other terminal at the bottom. On account of the higher heat developed within the core however, this return wire is raised to a deleterious temperature and quickly burns out. It has also been proposed to connect two resistance elements in series over the tops of the tubes, but this requires electrical connections to be made over the tops of the tubes after the cores are inserted, requiring dismantling of the heater in the event that it is desired to insert heating elements after the heater has been assembled and requires rather elaborate means and care to insulate the top connecting wires, particularly when the cores are disposed principally at the bottom portions of the tubes. In accordance with our invention, we provide a construction which eliminates all of these undesirable features and which permits the installation or removal of heating elements by merely removing the bottom closure plate and slipping the heating elements in or out. We accomplish this result by providing a unit heating element comprising two cores wound with resistance wire, the wire on the two cores being connected together at the top by the wire 12 which is covered with an insulating bead or sleeve 13. The tubes 7 are also formed in pairs, forming duplex tubes. Two adjacent tubes are connected by a passage 14 extending longitudinally of the tubes for at least the length of the heating elements. The duplex tube has a cross section somewhat in the form of a figure 8 having two chambers for the receipt of the two cores forming the duplex heating unit and a narrower connecting passage through which the cross wire 12 and its insulator pass as the heating unit is inserted or withdrawn.

The shell is closed at the bottom by a plate 15 removably held in place by screws or other suitable means, and the terminals 16 are mounted on the plate, being insulated therefrom by suitable means, such as blocks 17 of insulation.

The shell is enclosed in a heat insulating jacket, usually formed in two pieces 18—19, which slip over the shell, and through the lower one of which, the current carrying wires pass. The insulating jacket preferably comprises metallic shells 19 having linings 21 of heat insulating material, such as asbestos.

We claim:—

1. An electric water heater comprising a shell adapted to receive the water to be heated, a duplex tube arranged in said shell and a duplex heating unit disposed in said tube.

2. In an electric heater, a duplex tube and a duplex heating unit disposed in said tube.

3. In an electric heater, a duplex tube and a duplex heating unit disposed in said tube, both terminals of the heating unit being disposed at the same end thereof.

4. In an electric heater, a pair of tubes connected together by a longitudinal passageway, a heating element in each tube and a conductor disposed in the passageway and connecting the heating elements together at one end.

5. In an electric heater, a pair of substantially parallel tubes connected together by a passageway extending in the direction of the length of the tubes, a pair of heating elements adapted to be inserted into said tubes and a conductor connecting the heating elements at one end adapted to slide along said passageway as the elements are inserted in the tubes.

6. In an electric heater, a pair of substantially parallel tubes connected together by a passageway extending in the direction of the length of the tubes for the length of heating elements, a pair of heating elements disposed in said tubes, a conductor connecting said heating elements and disposed in said passageway and an insulator on said conductor.

7. In an electric heater, a pair of substantially parallel tubes connected together by a passageway extending in the direction of the length of the tubes from one end thereof, a helically wound heating element in each tube, and a conductor connecting the elements together at their ends remote from said tube ends and disposed in said passageway.

8. In an electric heater, a pair of substantially parallel tubes connected together along their length by a passageway extending from one end of the tubes, a refractory core in each tube, a helically wound heating element on each core and a conductor connecting the ends of the heating elements at their inner ends and lying in said passageway.

9. In an electric heater, a plurality of duplex tubes, a duplex heating unit in each tube, and adjacent terminals to which the heating units are connected.

10. An electric water heater comprising a shell adapted to receive the water to be heated, a plurality of tubes arranged in said shell connected together in pairs along their lengths by passageways extending from one end of the tubes, a heating element in each of the tubes, conductors lying in said passageways and connecting the heating elements together in pairs at their inner ends, and a pair of terminals to which the other ends of the heating elements are connected.

11. An electric water heater comprising a shell adapted to receive the water to be heated, a plurality of tubes arranged in said shell connected together in pairs along their lengths by passageways extending from one end of the tubes, a heating element in each of the tubes, conductors lying in said passageways and connecting the heating elements together in pairs at their inner ends, a removable plate arranged below said tubes and a pair of terminals to which the other ends of the heating elements are connected, mounted on said plate.

12. An electric water heater comprising a shell, a transverse head in said shell, a plurality of duplex tubes arranged in said shell and opening on said head, terminals arranged below said head and duplex heating units arranged in said tubes and connected to said terminals, both ends of the resistance wire of each duplex heating unit lying at the lower end of the unit.

13. An electric water heater comprising a shell, a plurality of duplex tubes open at their lower ends arranged in said shell and duplex heating units having both ends of the heating wire disposed at the bottom thereof, disposed in said tubes.

In testimony whereof, we have hereunto set our hands.

WILLIAM WESLEY HICKS.
ARTHUR J. KERCHER.